US010137908B2

(12) United States Patent
Deshpande et al.

(10) Patent No.: US 10,137,908 B2
(45) Date of Patent: Nov. 27, 2018

(54) VEHICLE TRACTION CONTROL SYSTEM AND METHOD

(71) Applicant: GENERAL ELECTRIC COMPANY, Schenectady, NY (US)

(72) Inventors: Sharath Srinivas Deshpande, Bangalore (IN); Vishram Vinayak Nandedkar, Bangalore (IN); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 14/496,655

(22) Filed: Sep. 25, 2014

(65) Prior Publication Data

US 2016/0090107 A1 Mar. 31, 2016
US 2018/0105188 A9 Apr. 19, 2018

Related U.S. Application Data

(63) Continuation-in-part of application No. 13/487,057, filed on Jun. 1, 2012, now Pat. No. 9,545,854.
(Continued)

(51) Int. Cl.
*B61C 17/12* (2006.01)
*B60W 10/04* (2006.01)
(Continued)

(52) U.S. Cl.
CPC ............... *B61C 17/12* (2013.01); *B60Q 1/40* (2013.01); *B60R 25/04* (2013.01); *B60S 1/0814* (2013.01);
(Continued)

(58) Field of Classification Search
CPC ..... Y02T 10/60; Y02T 10/6286; Y02T 10/62; Y02T 10/72; B60W 10/04; B60W 10/08
(Continued)

(56) References Cited

U.S. PATENT DOCUMENTS 6,230,496 B1    5/2001  Hofmann et al.
6,984,946 B2    1/2006  Donnelly et al.
(Continued)

FOREIGN PATENT DOCUMENTS

CA     2574391 A1 *  1/2006
CN   101791984 A     8/2010
(Continued)

OTHER PUBLICATIONS

Control, analysis and comparison of different control strategies of electric motor for battery electric vehicles applications; Hegazy, O.; Barrero, R.; Van Mierlo, J.; El Baghdad, M.; Lataire, P.; Coosemans, T.; Power Electronics and Applications (EPE), 2013 15th European Conference on; Year: 2013; pp. 1-13, DOI: 10.1109/EPE.2013.6631906.*
(Continued)

*Primary Examiner* — Cuong H Nguyen
(74) *Attorney, Agent, or Firm* — GE Global Patent Operation; John A. Kramer

(57) ABSTRACT

A method and system determine, during movement of a vehicle system along a route, a tractive load demanded by the vehicle system to propel the vehicle system along the route. The vehicle system includes a propulsion-generating vehicle having plural individually controllable traction motors. A first selected set of the traction motors for deactivation is identified during the movement of the vehicle system along the route based at least in part on the tractive load demanded by the vehicle system. The traction motors in the first selected set are deactivated while at least one of the traction motors in a first remaining set of the traction motors continues to generate tractive effort to propel the vehicle system. The traction motors that are selected for deactivation may all be on the same vehicle in the vehicle system, or may be on different vehicles of the same vehicle system.

22 Claims, 5 Drawing Sheets

Related U.S. Application Data

(60) Provisional application No. 61/496,556, filed on Jun. 13, 2011.

(51) Int. Cl.
*B60W 10/08* (2006.01)
*B60R 25/04* (2013.01)
*B60Q 1/40* (2006.01)
*B60S 1/08* (2006.01)

(52) U.S. Cl.
CPC ...... *B60W 2510/10* (2013.01); *Y02T 10/7258* (2013.01)

(58) Field of Classification Search
USPC .............. 475/5–6; 701/51, 82, 19, 22, 1, 93; 180/65.26, 65.27, 65.275; 477/80, 174; 307/125, 126
See application file for complete search history.

(56) References Cited

U.S. PATENT DOCUMENTS

| | | | | |
|---|---|---|---|---|
| 7,115,058 | B2* | 10/2006 | Duncan | B60K 1/00 475/5 |
| 8,009,023 | B2* | 8/2011 | Bergerhoff | B60R 25/24 340/10.41 |
| 8,784,267 | B2* | 7/2014 | Staudinger | B60W 30/16 477/120 |
| 9,221,840 | B2* | 12/2015 | Schwiebert | A61K 31/513 |
| 9,291,469 | B2 | 3/2016 | Hoch et al. | |
| 9,545,854 | B2 | 1/2017 | Daum et al. | |
| 2006/0094552 | A1* | 5/2006 | Duncan | B60K 1/00 475/5 |
| 2007/0191183 | A1* | 8/2007 | Petridis | B60K 6/24 477/109 |
| 2007/0219680 | A1 | 9/2007 | Kumar et al. | |
| 2008/0061925 | A1* | 3/2008 | Bergerhoff | B60R 25/24 340/5.6 |
| 2008/0074070 | A1* | 3/2008 | Kumar | B60L 9/00 318/561 |
| 2008/0290825 | A1* | 11/2008 | St-Jacques | B60L 7/12 318/380 |
| 2008/0319594 | A1* | 12/2008 | Shibata | B60K 6/485 701/22 |
| 2010/0078234 | A1 | 4/2010 | Bissontz | |
| 2010/0114404 | A1* | 5/2010 | Donnelly | B61D 3/16 701/2 |
| 2011/0060486 | A1 | 3/2011 | Meltser et al. | |
| 2011/0246004 | A1 | 10/2011 | Mineta | |
| 2012/0016551 | A1 | 1/2012 | Krause et al. | |
| 2012/0130609 | A1* | 5/2012 | Jess | B60W 10/06 701/54 |
| 2012/0220424 | A1* | 8/2012 | Staudinger | B60W 30/16 477/80 |
| 2012/0265421 | A1* | 10/2012 | Livshiz | B60W 10/06 701/102 |
| 2012/0299544 | A1 | 11/2012 | Prosser et al. | |
| 2014/0039778 | A1* | 2/2014 | Kerns | F02D 41/0087 701/103 |
| 2014/0114543 | A1* | 4/2014 | Mullner | G07C 5/00 701/67 |
| 2014/0200756 | A1 | 7/2014 | Sisk | |
| 2014/0263861 | A1 | 9/2014 | Pritchard et al. | |
| 2014/0277860 | A1* | 9/2014 | Pulliam | B60L 15/20 701/19 |
| 2014/0277862 | A1* | 9/2014 | Pritchard | B61C 17/12 701/19 |
| 2014/0350767 | A1 | 11/2014 | Fries | |
| 2015/0191183 | A1* | 7/2015 | Daum | B61L 15/0081 701/19 |
| 2016/0114818 | A1* | 4/2016 | Melas | B61L 15/0072 701/2 |
| 2016/0152255 | A1* | 6/2016 | Cuthbertson | B60B 27/0068 701/19 |

FOREIGN PATENT DOCUMENTS

| | | | |
|---|---|---|---|
| CN | 104340078 A | 2/2015 | |
| DE | 10 2006 042 976 | * 9/2006 | ............ B60R 25/24 |
| DE | WO2011/054621 | * 5/2011 | ............ B60W 30/16 |
| JP | 73080044 A | 11/1995 | |
| JP | 10336805 | 12/1998 | |
| JP | 2003164004 A | 6/2003 | |
| JP | 2008296834 A | 12/2008 | |
| JP | 2013055742 A | 3/2013 | |
| JP | 2013102655 A | 5/2013 | |
| WO | WO-2006009256 A1 | * 1/2006 | |
| WO | 2010139489 A1 | 12/2010 | |

OTHER PUBLICATIONS

Disturbing effects in rail vehicle traction drives; Dolecek, R.; Cerny, O.; Lenoch, V.; Schejbal, V.; Radioelektronika (RADIOELEKTRONIKA), 2012 22nd International Conference; Year: 2012; pp. 1-4.*

Simulation and analysis of an electric vehicle driven by two rear motors; Yong Chen; Daming Zhang; Guiyuan Li System Simulation and Scientific Computing, 2008. ICSC 2008. Asia Simulation Conference—7th International Conference on Year: 2008; pp. 872-876, DOI: 10.1109/ASC-ICSC.2008.4675485.*

Optimal Control of Traction Motor Drives Under Electrothermal Constraints; Lemmens, J.; Vanassche, P.; Driesen, J.; Emerging and Selected Topics in Power Electronics, IEEE Journal of; Year: 2014, vol. 2, Issue: 2; pp. 249-263, DOI: 10.1109/JESTPE.2014.2299765.*

High Efficient Intelligent Motor Control for a Hybrid Shunting Locomotive; Asaei, B.; Amiri, M. ; Vehicle Power and Propulsion Conference, 2007. VPPC 2007. IEEE; Year: 2007; pp. 405-411, DOI: 10.1109/VPPC.2007.4544160.*

Optimal Control Strategy for Hybrid Electric Vehicle Powertrain; Al-Aawar, N.; Arkadan, A.-R.A.; Emerging and Selected Topics in Power Electronics, IEEE Journal of; Year: 2015, vol. 3, Issue: 2; pp. 362-370, DOI: 10.1109/JESTPE.2014.2323019.*

The integration of AC drive technology to Amtrak's passenger locomotives; K. M. Watkins; Proceedings of the 1993 IEEE/ASME Joint Railroad Conference; Year: 1993; pp. 1-5, DOI: 10.1109/RRCON.1993.292970.*

Compare of Permanent Magnet Synchronous Motor Applied to Railway Vehicle Traction System; Jianghua Feng; Weihua Gui; Junfeng Xu; Jian Wang; 2007 2nd IEEE Conference on Industrial Electronics and Applications; Year: 2007; pp. 74-77, DOI: 10.1109/ICIEA.2007.4318372.*

Implementation on a microcontroller of a space vector modulation technique for NPC inverters; A. Bellini; S. Bifaretti; S. Costantini; 2004 IEEE International Symposium on Industrial Electronics; Year: 2004, vol. 2; pp. 935-940 vol. 2, DOI: 10.1109/ISIE.2004.1571939.*

Ford's Power Train Operations—changing the simulation environment; J. Ladbrook; A. Januszczak; Proceeding of the 2001 Winter Simulation Conference (Cat. No. 01CH37304) ; Year: 2001, vol. 2; pp. 863-869 vol. 2, DOI: 10.1109/WSC.2001.977385.*

Use of Stochastic Models for Operational Efficiency Analysis of Multi Power Source Traction Drives; Igor Bolvashenkov; Hans-Georg Herzog; 2016 Second International Symposium on Stochastic Models in Reliability Engineering, Life Science and Operations Management (SMRLO); Year: 2016; pp. 124-130, DOI: 10.1109/SMRLO.2016.30.*

Simulation model of a series DC motor for traction rail vehicles; Grażyna Barna; 2016 21st International Conference on Methods and Models in Automation and Robotics (MMAR); Year: 2016; pp. 531-536, DOI: 10.1109/MMAR.2016.7575192.*

Optimized energy-efficient drive system for ship propulsion; Carsten Heising; Volker Staudt; Andreas Steimel 2011 IEEE Electric Ship Technologies Symposium; Year: 2011; pp. 292-295, DOI: 10.1109/ESTS.2011.5770884.*

Performance Analysis of Hybrid Network of Indian Traction Power System Using Renewable Energy Sources; Laxman Singh; Chandan Vaishnav; Vivek Shrivastava; 2016 International Conference on

(56) References Cited

OTHER PUBLICATIONS

Micro-Electronics and Telecommunication Engineering (ICMETE); Year: 2016; pp. 611-615, DOI: 10.1109/ICMETE.2016.101.*
Main problems and proposed solutions to induction machine drive control of multisystem locomotive Zdenek Peroutka; Tomas Glasberger; Martin Janda 2009 IEEE Energy Conversion Congress and Exposition; Year: 2009; pp. 430-437. (Year: 2009).*
Comparison of two different winding topologies for external-rotor five-phase PM-assisted synchronous reluctance motor in vehicle applications; Md. Zakirul Islam; Sai Sudheer Reddy Bonthu; Seungdeog Choi; 2017 IEEE International Electric Machines and Drives Conference (IEMDC); pp. 1-6; Year: 2017.*
Influence of number of gear step on engine and motor operation characteristics for parallel HEV; Hyunhwa Kim; Junbeom Wi; Jiho Yoo; Hanho Son; Hyunsoo Kim; Chiman Park; 2018 Thirteenth International Conference on Ecological Vehicles and Renewable Energies (EVER); pp. 1-7; Year: 2018.*
Modeling of electric vehicle loads for power flow analysis based on PSAT; Yuttana Kongjeen; Krischonme Bhumkittipich 2016 13th International Conference on Electrical Engineering/Electronics, Computer, Telecommunications and Information Technology (ECTI-CON); pp. 1-6; Year: 2016.*
Research and design of control system based on NRF24I01 for intellectualized vehicle; Dunli Hu; Haoran Ke; Wenqing Fu 2017 6th Data Driven Control and Learning Systems (DDCLS); pp. 685-689; Year: 2017.*
Unofficial English translation of Office Action issued in connection with corresponding JP Application No. 2015184572 dated Aug. 23, 2016.
Unofficial English Translation of Chinese Office Action issued in connection with corresponding CN Application No. 201510973813.3 dated Aug. 9, 2017.
AIS Marine Traffic; "MarineTraffic Voyage Planner" Webpage, 2018, https://www.marinetraffic.com/en/voyage-planner (2 pages).
Britannica.com, "Shipping Route" The Editors of Encyclopedia Britannica, https://www.britannica.com/technology/shipping-route (3 pages).
Castillo-Villar et al., "Heuristic Procedure for a Ship Routing and Scheduling Problem with Variable Speed and Discretized Time Windows", Research Article, 2014, Mathematical Problems in Engineering, vol. 2014, Article ID 750232 (10 pages).
dictionary.com, "Define Route", Dictionary.com, (5 pages).
Eskild, "Development of a Method for Weather Routing of Ships", 2014, Institutt for Marin Teknikk, [1361] (1 page).
Faulkner, "Determining Optimum Ship Routes", Journal Article, 1962, vol. 10, No. 6, pp. 799-807, Informs, DOI: 10.1002/j.2161-4296.1963.tb02061.x (3 pages).
Faulkner, "Numerical Methods for Determining Optimum Ship Route", Dec. 1963, vol. 10, Issue 4 (2 pages).
Ocean Weather Services, "About Optimum Ship Routing", Webpage, Florida, United States, http://www.oceanweatherservices.com/featured_blog_posts/about_optimum_ship_routing (3 pages).
Roh, "Determination of an Economical Shipping Route Considering the Effects of Sea State for Lower Fuel Consumption", Science Direct, Jun. 2013, vol. 5, Issue 2, pp. 246-262 (29 pages).

\* cited by examiner

VEHICLE TRACTION CONTROL SYSTEM AND METHOD

FIELD

Embodiments of the subject matter disclosed herein relate to controlling propulsion systems of vehicles and/or vehicle systems.

BACKGROUND

Some known vehicles include multiple motors that generate tractive force to move the vehicles along a route. For example, locomotives may include multiple traction motors that operate to rotate axles and/or wheels of the locomotives. During trips of such vehicles, the amount of tractive force needed to propel the vehicles changes. The load of the vehicles can change over time for a variety of factors, such as wind conditions, adhesion between the wheels and the route, changing amounts of cargo being carried by the vehicles, or the like.

Because of the changing load of the vehicles, the amount of tractive force needed to move the vehicle can change over time. But, some known vehicles keep all traction motors actively generating tractive force to propel the vehicles, even if some of the traction motors are generating a relatively small amount of tractive force. Some other known vehicle consists (e.g., trains) having two or more locomotives may turn off all traction motors in one of the locomotives when less than all traction motors are needed for propelling the consist. These consists rely on simulations of travel of the consists by an off-board computing system. The simulations determine locations where a locomotive can be turned off prior to the consist embarking on a trip. During the trip, the consist may refer to the previously simulated travels and turn off a locomotive at one or more locations based on the simulations.

But, these simulations rely on calculated amounts of tractive forces needed to move the consist. Because the simulations are performed prior to embarking on a trip, these consists are unable to adapt to changing conditions during movement. For example, the consists are not able to turn any traction motors on or off based on a real time change in the needed tractive forces that was not present in the simulations.

BRIEF DESCRIPTION

In one embodiment, a method (e.g., for operating a vehicle traction control system of a vehicle system during movement of the vehicle system) includes, during movement of a vehicle system along a route, determining a tractive load demanded by the vehicle system to propel the vehicle system along the route. The vehicle system includes a propulsion-generating vehicle having plural individually controllable traction motors. The method also can include identifying a first selected set of the traction motors for deactivation during the movement of the vehicle system along the route based at least in part on the tractive load demanded by the vehicle system, and deactivating the traction motors in the first selected set while at least one of the traction motors in a first remaining set of the traction motors continues to generate tractive effort to propel the vehicle system. One or more of the operations of the method (e.g., the determining of a tractive load demanded by the vehicle system, identifying the first selected set of the traction motors, and/or deactivating the traction motors) may be performed by one or more processors disposed onboard the vehicle system.

In another embodiment, a system (e.g., a traction control system) includes one or more processors configured to be disposed onboard a vehicle system and to determine, during movement of the vehicle system along a route, a tractive load demanded by the vehicle system to propel the vehicle system. The vehicle system includes a propulsion-generating vehicle having plural individually controllable traction motors. The one or more processors also are configured to identify a first selected set of the traction motors for deactivation during movement of the vehicle system along the route based at least in part on the tractive load demanded by the vehicle system and to deactivate the traction motors in the first selected set while at least one of the traction motors in a first remaining set of the traction motors continues to generate tractive effort to propel the vehicle system.

In another embodiment, another system (e.g., another traction control system) includes one or more processors configured to monitor tractive loads demanded to propel a vehicle system along a route as the vehicle system moves along the route. The one or more processors are configured to identify one or more traction motors of a vehicle in the vehicle system to turn off based at least in part in a change in the tractive loads demanded to propel the vehicle system. The one or more processors are configured to generate control signals to turn off the one or more traction motors while one or more other traction motors remain on to generate tractive forces that meet or exceed the tractive loads demanded to propel the vehicle system during movement of the vehicle system along the route.

In another embodiment, another method (e.g., for controlling a traction control system) includes, during movement of a vehicle system along a route, determining a tractive load demanded by the vehicle system to propel the vehicle system along the route. The vehicle system includes a first propulsion-generating vehicle having a first plurality of individually controllable traction motors and a second propulsion-generating vehicle having a second plurality of individually controllable traction motors. The first and second vehicles are linked to travel together along the route. The method also includes identifying a first selected set of the first plurality of traction motors for deactivation during movement of the vehicle system along the route based at least in part on the tractive load demanded by the vehicle system, deactivating the traction motors in the first selected set while at least one of the traction motors in a first remaining set of the first plurality of traction motors continues to generate tractive effort to propel the vehicle system, identifying a second selected set of the second plurality of traction motors for deactivation during movement of the vehicle system along the route based at least in part on the tractive load demanded by the vehicle system, and deactivating the traction motors in the second selected set while at least one of the traction motors in a second remaining set of the second plurality of traction motors continues to generate tractive effort to propel the vehicle system.

In another embodiment, another system (e.g., another traction control system) includes one or more processors configured to be disposed onboard a vehicle system and to determine, during movement of the vehicle system along a route, determine a tractive load demanded by the vehicle system to propel the vehicle system along the route. The vehicle system includes a first propulsion-generating vehicle having a first plurality of individually controllable traction motors and a second propulsion-generating vehicle having a second plurality of individually controllable traction motors, the first and second vehicles being linked to travel together along the route. The one or more processors also are configured to identify a first selected set of the first plurality of traction motors for deactivation during movement of the vehicle system along the route based at least in part on the tractive load demanded by the vehicle system, and to deactivate the traction motors in the first selected set while at least one of the traction motors in a first remaining set of the first plurality of traction motors continues to generate tractive effort to propel the vehicle system. The one or more processors also are configured to identify a second selected set of the second plurality of traction motors for deactivation during movement of the vehicle system along the route based at least in part on the tractive load demanded by the vehicle system, and to deactivate the traction motors in the second selected set while at least one of the traction motors in a second remaining set of the second plurality of traction motors continues to generate tractive effort to propel the vehicle system.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
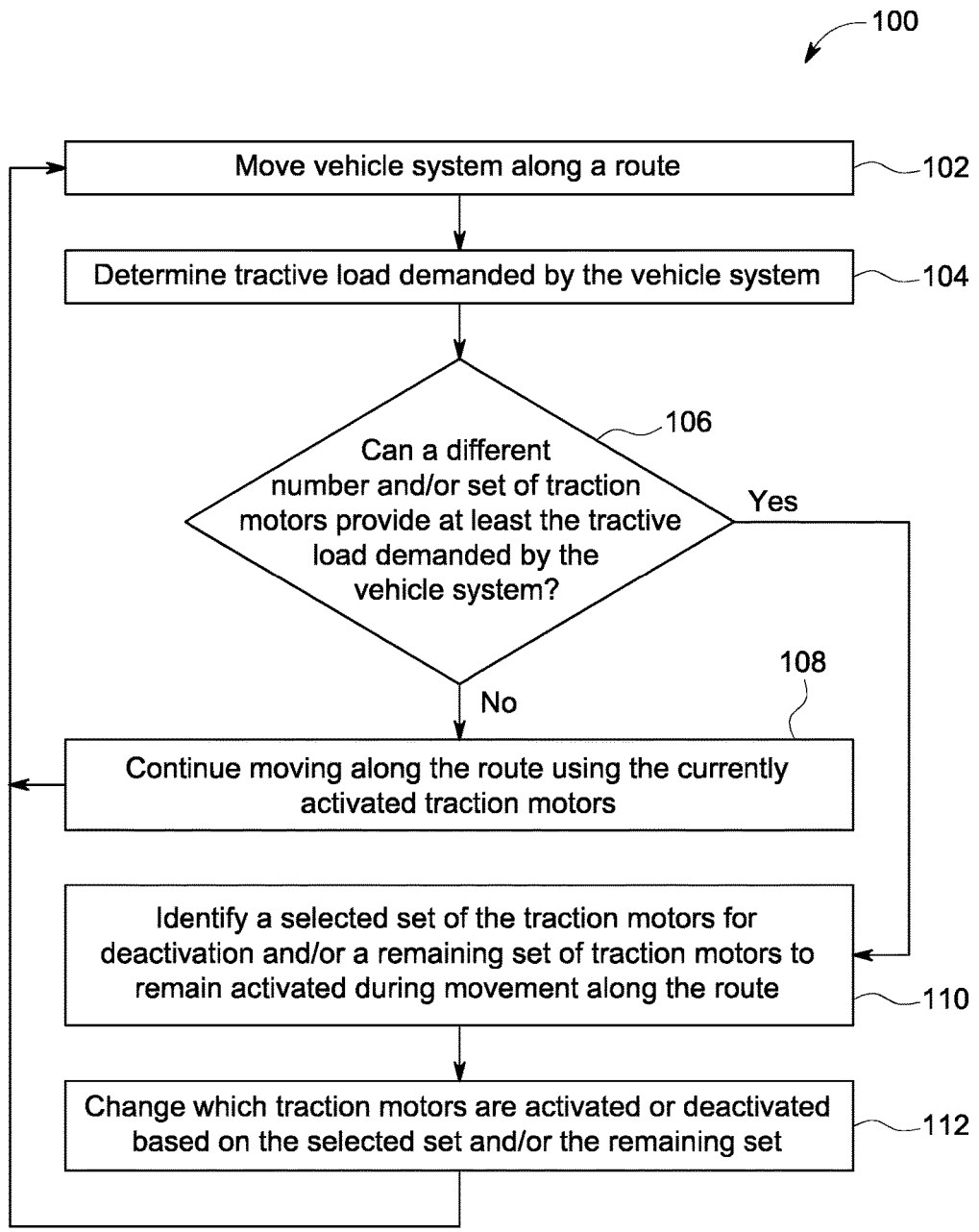
FIG. 1 is a flowchart of a method for operating a vehicle traction control system of a vehicle system during movement of the vehicle system according to one embodiment.

One or more embodiments described herein provide systems and methods for individually controlling which traction motors in a vehicle having multiple traction motors are activated or deactivated at different times during movement of the vehicle. The different traction motors of the vehicle can be operably coupled with different axles and/or wheel sets of the vehicle such that the activated traction motors work to rotate the axles and/or wheel sets to propel the vehicle while the deactivated traction motors do not work to rotate the axles and/or wheel sets. The vehicle can be included in a larger vehicle system having one or more other vehicles connected with each other, such as a vehicle consist. During movement along a route, a tractive load demanded to propel the vehicle system along the route can be determined. This tractive load can be compared to the capabilities of the traction motors to produce tractive effort. If fewer than all of the traction motors in a vehicle can be activated and still provide at least the tractive load demanded by the vehicle system (or at least the portion of the tractive load that is attributable to the vehicle), then one or more of the traction motors may be deactivated while the remaining traction motors in the vehicle remain activated. The selection of which traction motors in a vehicle are activated or deactivated can change over time based on changes in the tractive load demanded by the vehicle system to propel the vehicle system. In one aspect, the selection of which traction motors are activated or deactivated is performed based at least in part in operating temperatures of the traction motors. For example, the traction motors having larger operating temperatures than one or more other traction motors may be selected for deactivation.

The systems and methods described herein operate according to a strategy to channel horsepower produced by traction motors more efficiently than currently known systems and methods. In conditions where the vehicle system has lesser tractive loads demanded to propel the vehicle system (e.g., light load conditions, such as when a locomotive is lightly loaded with a light train or an empty train, fast moving speeds during lower throttle notches, etc.), the traction motors may underloaded, and may not be operating in an efficient manner. Under such conditions, by turning off one or more traction motors, the load on the other traction motors may increase. Instead of underloading the traction motors, it can be possible to increase the load on the traction motors to or near the rated values of the traction motors by deactivating other traction motors. The load can be increase to or near the rated values of the traction motors when the load is increased to be equivalent to or within a designated range (e.g., 1%, 5%, 10%, or the like) of the rated capacities of the traction motors. In one aspect, the rated capacity of a traction motor may be the maximum power rating of the traction motor, or a designated limit of the power output of the traction motor other than the maximum power rating (e.g., 60%, 70%, 80%, 90%, or the like, of the maximum power rating).

Changing the loading of the traction motors can lead to improved operating efficiencies without sacrificing performance and, as a result, energy consumption can be reduced (such as by at least 1%) relative to not changing the loading of the traction motors. For example, if the same vehicle system travels over the same routes during the same conditions between the same locations during a first trip where all traction motors remain activated during the entire trip and during a different, second trip where the traction motors are selectively activated or deactivated during movement in the trip, the vehicle system may consume at least 1% less energy during the second trip than during the first trip.

Figure 2:
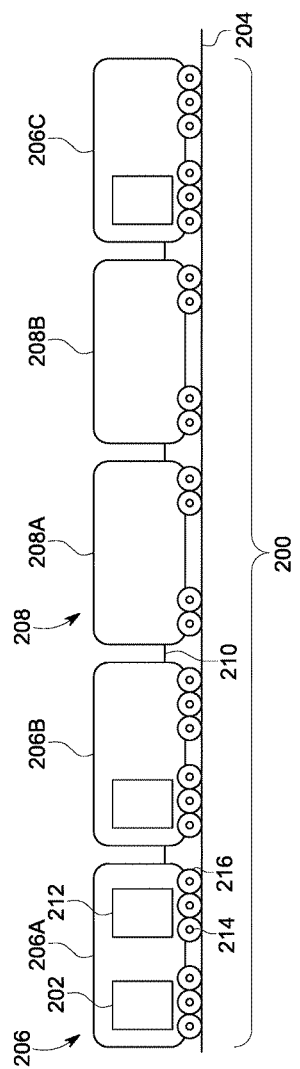
FIG. 2 is a schematic diagram of a vehicle system having a traction control system according to one embodiment.

FIG. 1 is a flowchart of a method 100 for operating a vehicle traction control system of a vehicle system during movement of the vehicle system according to one embodiment. FIG. 2 is a schematic diagram of a vehicle system 200 having a traction control system 202 according to one embodiment. The method 100 may be performed by one or more embodiments of the traction control system 202. For example, one or more processors of the vehicle system 200 can perform the operations of the method 100. At 102, the vehicle system 200 moves along a route 204 (shown in FIG. 2). The vehicle system 200 represents a vehicle consist, such as a rail vehicle consist, having propulsion-generating vehicles 206 (e.g., vehicles 206A-C) and non-propulsion-generating vehicles 208 (e.g., vehicles 208A-B) mechanically coupled together by couplers 210. While the description herein focuses on the vehicle system 200 being a rail vehicle consist (e.g., a train) having locomotives as the vehicles 206 and railcars as the vehicles 208, alternatively, one or more embodiments described herein may be applied to other types of vehicle consists and/or vehicles, such as other off-highway vehicles (e.g., mining vehicles or other vehicles that are not designed or permitted for travel on public roadways), marine vessels, automobiles, or the like.

The vehicles 206 include propulsion systems 212 comprising several traction motors (shown and described below) operably coupled with different axles 214 and/or wheels 216 of the vehicles 206. The traction motors may be connected with the axles 214 and/or wheels 216 via one or more gears, gear sets, or other mechanical devices to transform rotary motion generated by the traction motors into rotation of the axles 214 and/or wheels 216 to propel the vehicles 206 and, consequently, the vehicle system 200. Different traction motors may be operably connected with different axles 214 and/or wheels 216 such that traction motors that are deactivated (e.g., turned OFF) do not rotate corresponding axles 214 and/or wheels 216 while traction motors that remain activated (e.g., turned ON) rotate corresponding axles 214 and/or wheels 216.

Returning to the description of the method 100 shown in FIG. 1, at 104, a tractive load demanded by the vehicle system 200 is determined. The tractive load demanded by the vehicle system 200 can represent the amount of tractive effort or power (e.g., horsepower) that is calculated as being necessary to propel the vehicle system 200 over an upcoming segment of the route 204. The tractive load demanded by the vehicle system 200 can be calculated based on a variety of factors, such as the size of the vehicle system 200 (e.g., the weight, mass, length, or the like, of the vehicle system 200), the curvature of the route 204, the grade of the route 204, weather conditions (e.g., wind direction, wind speed, precipitation, ambient temperature, or the like), adhesion of the wheels 214 to the route 204, locations of the vehicles 206 in the vehicle system 200, or the like. For example, as the size of the vehicle system 200 increases, a radius of curvature of the route 204 decreases, the grade of the route 204 increases, the weather conditions become more adverse (e.g., headwinds become stronger), adhesion increases, or the like, then the tractive load demanded may increase. Conversely, as the size of the vehicle system 200 decreases, a radius of curvature of the route 204 increases, the grade of the route 204 decreases, the weather conditions become less adverse, adhesion decreases, or the like, then the tractive load demanded may decrease. The tractive load demanded may be calculated from one or more mathematical or physics-based models of the vehicle system 200 and the route 204, and/or may be based on previous trips of the vehicle system 200 and/or another vehicle system 200 along the route 204.

In one aspect, the tractive load demanded by the vehicle system 200 can be determined independent of the location of the vehicle system 200. For example, instead of determining how much tractive effort is needed at various locations along the route to propel the vehicle system 200, monitoring locations of the vehicle system 200, and then determining the tractive load demanded by the vehicle system 200 as a function of location, the tractive load demanded by the vehicle system 200 may be determined based at least in part on the current movement of the vehicle system 200. If the vehicle system 200 is traveling slower than a designated speed (e.g., a speed limit of the route, a speed selected by an onboard operator, a speed dictated by a trip plan or speed profile that designates speeds as a function of time and/or distance along the route, or the like), then the tractive load demanded by the vehicle system 200 can increase. Conversely, if the vehicle system 200 is traveling faster than the designated speed, then the tractive load demanded by the vehicle system 200 can decrease.

At 106, a determination is made as to whether a different number and/or set of the traction motors in one or more of the vehicles 206 of the vehicle system 200 can be activated to provide at least the tractive load demanded by the vehicle system 200. For example, if all traction motors of the vehicles 206 in the vehicle system 200 are activated and generating tractive force to propel the vehicle system 200, then a determination may be made as to whether a lesser number of the traction motors can be activated (with one or more traction motors being turned off), while still generating at least enough tractive force to provide the tractive load demanded by the vehicle system 200.

If the currently activated traction motors are needed to remain activated to produce at least the tractive load demanded by the vehicle system 200, then it may not be possible to deactivate one or more of the traction motors while still generating at least the tractive load demanded by the vehicle system 200. As a result, flow of the method 100 can proceed to 108. At 108, the currently activated traction motors remain activated to continue generating at least the tractive effort demanded by the vehicle system 200. The vehicle system 200 can continue moving along the route using the same activated traction motors, and flow of the method 100 can return to 102.

On the other hand, if one or more traction motors can be deactivated while the remaining traction motors remain on to propel the vehicle system 200 by providing at least the tractive load demanded by the vehicle system 200, then flow of the method 100 can proceed to 110. For example, a selected set of one or more traction motors may be deactivated, but the tractive force provided by the remaining traction motors (that remain activated) may be increased so that the summed output of the remaining, activated traction motors at least meets the demanded tractive load.

At 110, a selected set of one or more traction motors is identified for deactivation, and/or a remaining set of one or more traction motors is identified to be activated (e.g., if the motors are currently deactivated) and/or is identified to remain activated. The identification of which motors to activate and which to deactivate can occur during movement of the vehicle system 200 along the route.

The traction motors can be identified for deactivation and/or for activation based on at least in part on actual output capabilities of the traction motors, rated capacities of the traction motors, operating temperatures of the traction motors, or the like. The actual output capabilities represent how much tractive effort or force that the traction motors are actually able to generate. Due to age, damage, or the like, the amount of tractive effort or force that a traction motor is able to generate can decrease over time. The decreasing abilities of the traction motors can be used to determine which traction motors to select for activation or deactivation. For example, newer and/or less damaged traction motors may be selected for activation to provide larger demanded traction loads of the vehicle system relative to older and/or more damaged traction motors.

The rated capacities of the traction motors can represent designated limits on the amount of tractive effort or force provided by the traction motors. The rated capacities can represent power ratings of the motors, such as the amount of watts, horsepower, or the like, that the motors are designed and/or designated to provide. The rated capacities may not represent the maximum power outputs that the motors are capable of generating, but may instead be less than the maximum power outputs. Alternatively, the rated capacities can represent the largest power outputs that the motors are able to generate. The selection of which motors to activate and/or which motors to deactivate may be made based on the rated capacities by selecting those motors having combined rated capacities that meet or exceed the tractive load demanded by the vehicle system 200.

The operating temperatures of the traction motors represent the temperatures at which the traction motors are operating. The operating temperatures may not represent the ambient temperature or the temperature around the motors, but instead may represent how hot the motors are. The traction motors may be selected for activation and/or deactivation based at least in part on the operating temperatures of the traction motors to avoid overheating and/or damaging the motors. For example, if the operating temperature of a motor is at or above a designated upper temperature limit, then that motor may be selected for deactivation and/or may be excluded from being selected for activation. As another example, if the operating temperature of the motor is at or below a designated lower temperature limit, then that motor may be selected for activation and/or excluded from being selected for deactivation. The operating temperatures of the traction motors may be monitored over time to ensure that the traction motors do not overheat. If the operating temperatures of some traction motors become too large, then those traction motors may be selected for deactivation and deactivated while the vehicle system 200 is moving to allow the traction motors to cool down. One or more of these traction motors may later be selected for activation responsive to the operating temperatures of the one or more traction motors decreasing to or below a limit, such as the lower temperature limit.

In one aspect, the traction motors that are selected for deactivation may all be on a single vehicle of the vehicle system. For example, a subset of the traction motors on a first vehicle in the vehicle system may be selected for deactivation, while the remaining traction motor or motors in the first vehicle may not be selected for deactivation and the traction motors on other vehicles in the vehicle system are not selected for deactivation. In another aspect, the traction motors that are selected for deactivation may span across multiple different vehicles in the same vehicle system. For example, the set of the traction motors that is selected for deactivation may include at least one traction motor of a first vehicle and at least one traction motor of a second vehicle in the same vehicle system, while one or more other traction motors of the first vehicle and one or more other traction motors of the second vehicle are not selected for deactivation.

At 112, the traction motors that were selected for deactivation are deactivated and/or the traction motors that were selected for activation are activated. For example, if a first and third traction motor of one vehicle 206A are selected for deactivation, a second and third traction motor of another vehicle 206B are selected for deactivation, and a fifth traction motor of another vehicle 206C are selected for deactivation, then those traction motors may be turned off while the vehicle system 200 moves along the route. Optionally, one or more deactivated traction motors may be turned on while the vehicle system 200 moves along the route.

Flow of the method 100 can return to 102 so that the vehicle system 200 continues to move along the route, and the determination of the tractive load demanded by the vehicle system 200, the determination of whether a different number and/or set of traction motors may be used to provide at least the tractive load demanded, the identification of which traction motors to activate and/or deactivate, and the activation and/or deactivation of the traction motors can be repeated one or more times during movement of the vehicle system 200. For example, at one or more times when the tractive load demanded by the vehicle system 200 changes, the identification and/or deactivation of one or more traction motors can be repeated so that the traction motors in the vehicle system 200 are not generating significantly more or less tractive effort than what is needed to meet the tractive load demanded by the vehicle system 200.

In one aspect, operating states of the traction motors that are selected for activation or that are not deactivated can be modified by increasing the tractive effort provided by these traction motors. For example, in a vehicle 206, if two of six traction motors are deactivated and the other four traction motors are activated, then the tractive effort generated by the activated traction motors can be increased. The tractive effort can be increased in order to meet the tractive load demanded by the vehicle system 200. In one embodiment, the output of the traction motors can be increased to or above one or more limits, such as by increasing the power output of the traction motors to or above the rated capacities of the traction motors. For example, if the activated traction motors do not have sufficiently large rated capacities to meet or exceed the tractive load demanded by the vehicle system 200, then one or more of the traction motors may be operated above the rated capacities of the one or more traction motors such that the total output of the activated traction motors is at least as large as the tractive load demanded by the vehicle system 200.

Figure 3:
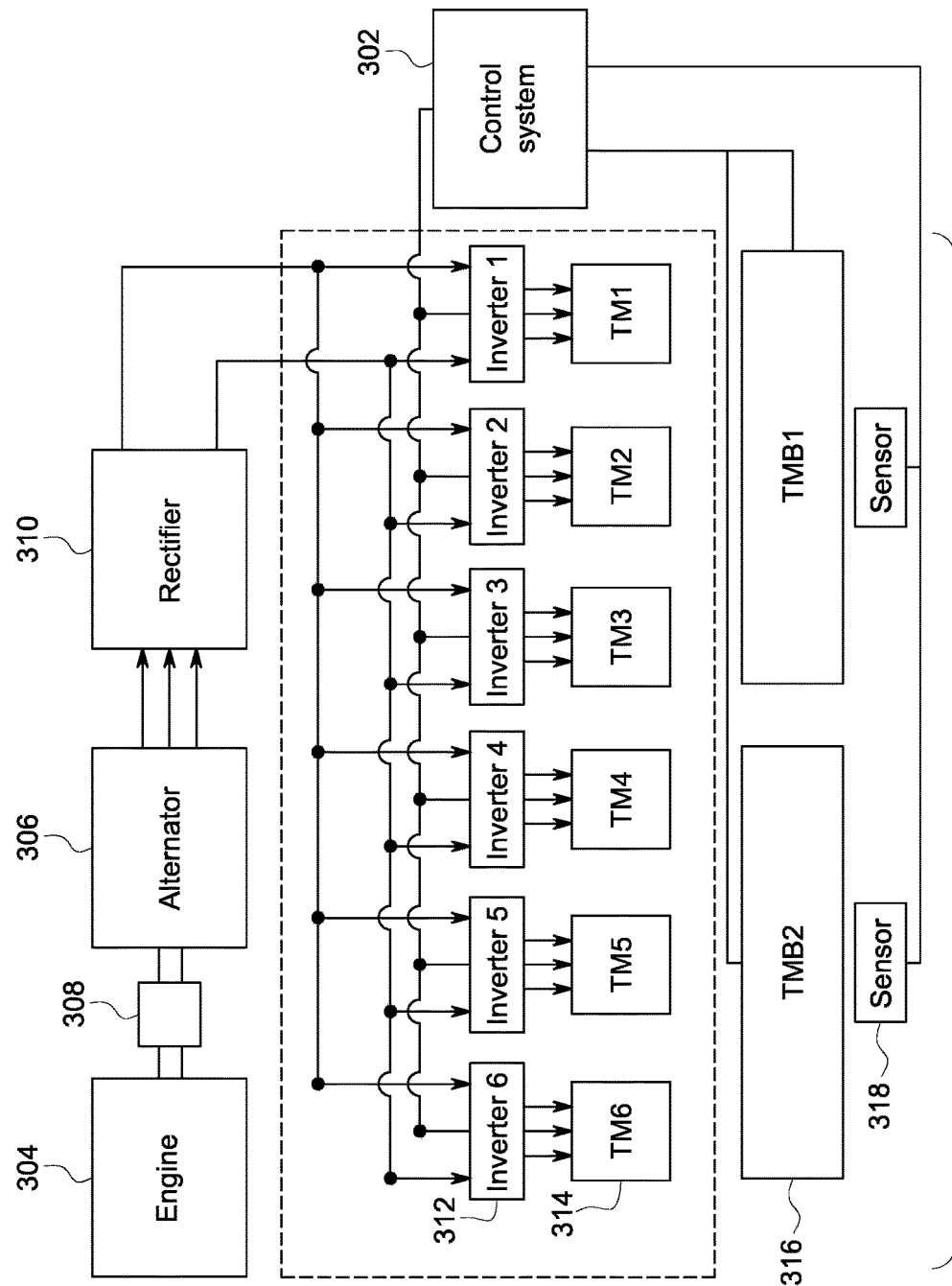
FIG. 3 illustrates a circuit diagram of a propulsion system and a traction control system according to one embodiment.

FIG. 3 illustrates a circuit diagram of a propulsion system 300 and a traction control system 302 according to one embodiment. The propulsion system 300 can represent one or more of the propulsion systems 212 shown in FIG. 2 and the control system 302 can represent the control system 202 shown in FIG. 2. The propulsion system 300 includes one or more engines 304 that are operably connected with an alternator or generator 306 ("Alternator" in FIG. 3) by one or more shafts 308. The engine 304 rotates the shaft 308 to cause the alternator or generator 306 to generate electric current. This electric current is supplied to a rectifier 310, which then supplies the current to several inverters 312 ("Inverter 1," "Inverter 2," "Inverter 3," "Inverter 4," "Inverter 5," and "Inverter 6" in FIG. 3). The inverters 312 are connected with different traction motors 314 ("TM1," TM2," "TM3," "TM4," "TM5," and "TM6" in FIG. 3) in the illustrated embodiment. The inverters 312 also are operably connected with the control system 302. The control system 302 can control which traction motors 314 are activated or deactivated, and/or the operating state of the traction motors 314, via control signals that are communicated to the inverters 312. For example, the control system 302 can communicate different control signals to different inverters 312 via one or more wired and/or wireless connections to individually control which ones of the inverters 312 activate the corresponding traction motors 314, which inverters 312 deactivate corresponding traction motors 314, the current supplied from the inverters 312 to the corresponding traction motors 314 (e.g., to control the power outputs from the traction motors 314), or the like.

Several traction motor blowers 316 ("TMB1" and "TMB2" in FIG. 3) represent fans that move air toward the traction motors 314 in order to cool the traction motors 314. One traction motor blower 316 may cool several traction motors 314 in one embodiment. The speeds at which the traction motor blowers 316 operate may be controlled via control signals communicated from the control system 302 to the traction motor blowers 316. Several temperature sensors 318 sense or measure the operating temperatures of the traction motors 314 and generate data representative of the operating temperatures of the traction motors 314. This data can be communicated to the control system 302. As described above, the control system 302 can at least partially base the selection of which traction motors 314 to turn ON or OFF based on the operating temperatures of the traction motors 314.

As described above, the control system 302 can deactivate one or more traction motors 314 and optionally increase the operating state of one or more other traction motors 314 so that the combined power output of the activated traction motors 314 meets or exceeds the tractive load demanded by the vehicle system 200. Doing so can increase the efficiency of the propulsion system 300 relative to propelling the vehicle system 200 with a larger number of activated traction motors 314.

Figure 4:
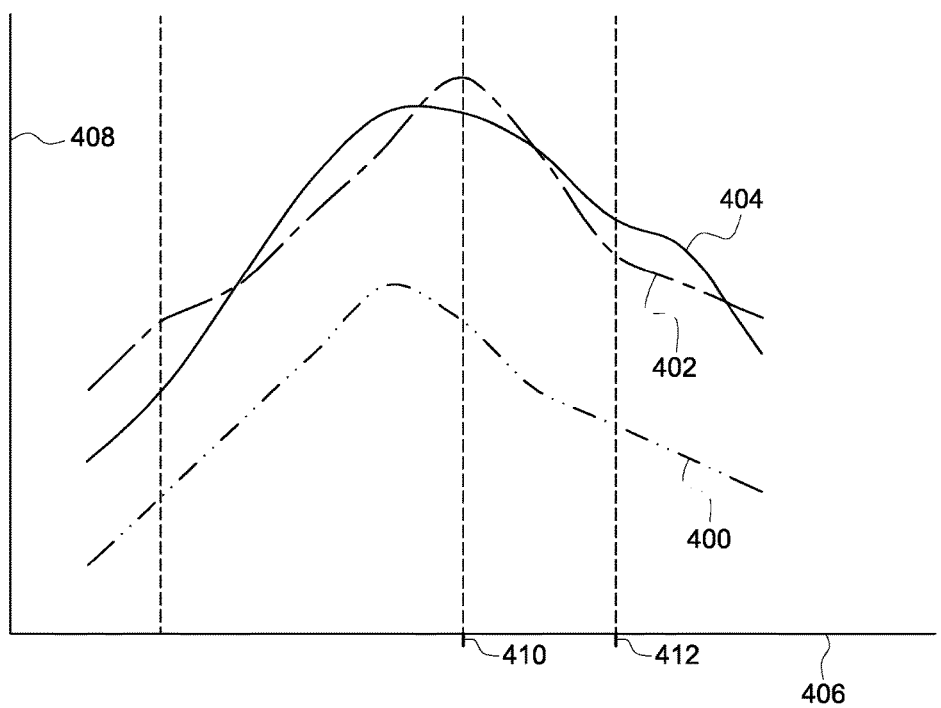
FIG. 4 illustrates efficiency indices of different operating states of traction motors shown in FIG. 3 of a propulsion-generating vehicle shown in FIG. 2 according to one example.

FIG. 4 illustrates efficiency indices 400, 402, 404 of different operating states of traction motors 314 (shown in FIG. 3) of a propulsion-generating vehicle 206 (shown in FIG. 2) according to one example. The efficiency indices 400, 402, 404 are shown alongside a horizontal axis 406 representative of moving speeds of the vehicle 206 and alongside a vertical axis 408 representative of efficiencies of the vehicle 206. The efficiency indices 400, 402, 404 represent how efficiently the propulsion system 300 of the vehicle 206 operate with different numbers of traction motors 314 being activated. The efficiency index 400 represents the efficiency of the propulsion system 300 operating with all six traction motors 314 being activated at different speeds of the vehicle 206. The efficiency index 402 represents the efficiency of the propulsion system 300 operating with five traction motors 314 being activated and one traction motor 314 being deactivated at different speeds of the vehicle 206. The efficiency index 404 represents the efficiency of the propulsion system 300 operating with four traction motors 314 being activated and two traction motors 314 being deactivated at different speeds of the vehicle 206. The efficiency indices 400, 402, 404 can be measured or calculated based on losses in electric current that is generated by the alternator or generator 306 (shown in FIG. 3), but that is not converted into tractive effort by one or more traction motors 314. For example, larger efficiency indices 400, 402, 404 at a particular speed indicate that less electric current is lost and not being converted into tractive effort relative to smaller efficiency indices 400, 402, 404 at the same speed.

As shown in FIG. 4, for a particular route and at a speed of the vehicle 206, there are three options for which traction motors 314 are turned on or off (e.g., no traction motors 314 being deactivated, as represented by the indices 400; one traction motor 314 being deactivated, as represented by the indices 402; or two traction motors 314 being deactivated, as represented by the indices 404). The option that provides the largest or a larger efficiency may be selected. For example, at a first speed 410, one traction motor 314 may be turned off while the remaining five traction motors 314 remain on. But, at a faster, second speed 412, two traction motors 314 may be turned off while four traction motors 314 remain on to provide for increased efficiency of the vehicle 206 (relative to another combination of traction motors 314 being turned off).

The efficiency at which a vehicle 206 and/or the vehicle system 200 operates also may be increased by reducing the amount of electric current that is consumed by the traction motor blowers 316. For example, the electric power consumed by a traction motor blower 316 when the traction motor blower 316 is operating at full speed is approximately eight times the electric power consumed by the same traction motor blower 316 operating at half speed. In order to reduce the amount of electric current consumed (and thereby increase the efficiency in which the vehicle 206 and/or vehicle system 200 operates), the control system 302 optionally can reduce the operating speeds of the traction motor blowers 316. In one embodiment, the control system 302 turns off the traction motor blowers 316 that work to cool the traction motors 314 that are turned off, and/or reduces the operating speed (e.g., the speed at which the traction motor blower 316 operates to move air to cool the traction motor 314) of the traction motor blowers 316 that remain on to cool the traction motors 314 that remain on. Doing so can further increase the efficiency at which the vehicle 206 and/or vehicle system 200 operates. Increasing the efficiency of the vehicle 206 and/or vehicle system 200 can reduce the amount of fuel consumed by the vehicle 206 and/or vehicle system 200.

Figure 5:
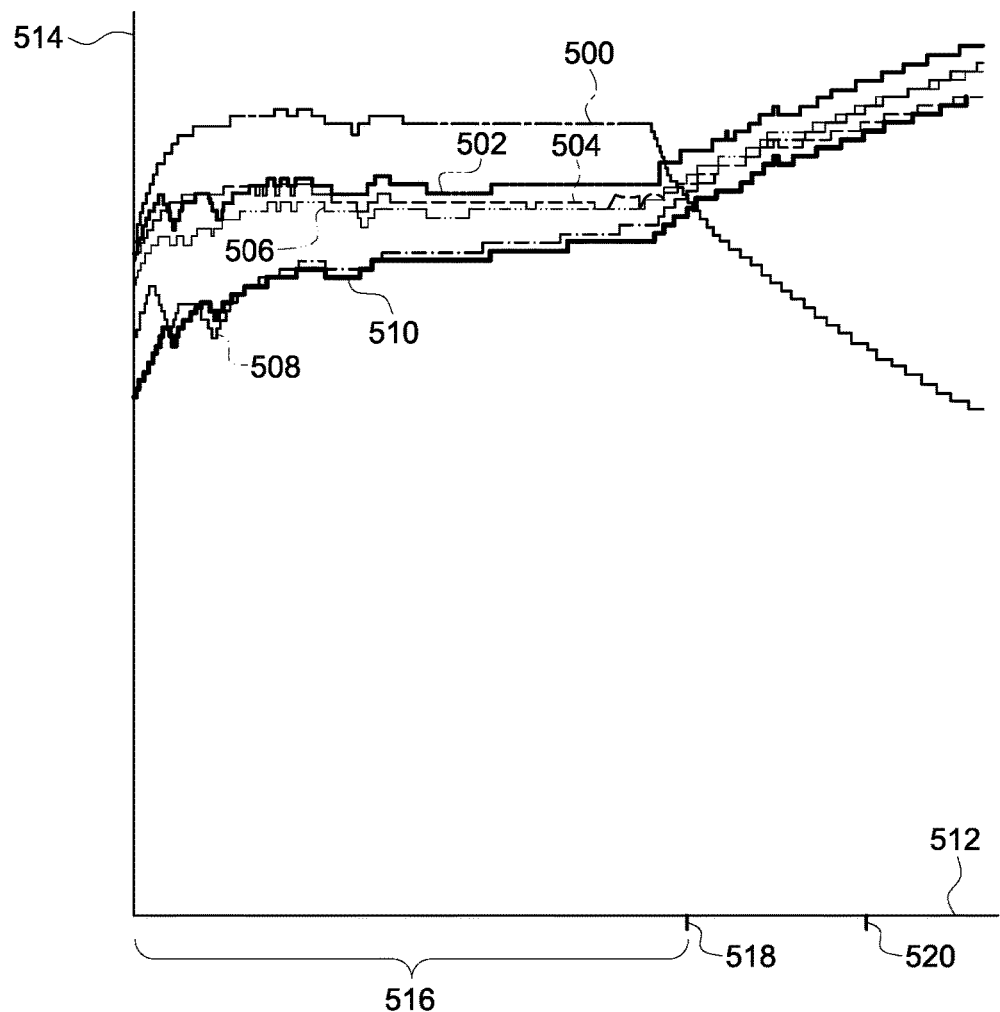
FIG. 5 illustrates operating temperatures of traction motors shown in FIG. 3 according to one example of operation of the propulsion system shown in FIG. 3.

FIG. 5 illustrates operating temperatures 500, 502, 504, 506, 508, 510 of traction motors 314 according to one example of operation of the propulsion system 300 shown in FIG. 3. The operating temperatures 500, 502, 504, 506, 508, 510 are shown alongside a horizontal axis 512 representative of time and a vertical axis 514 representative of temperatures. During a first time period 516, all six of the traction motor blowers 316 shown in FIG. 3 are active to work to cool corresponding ones of the traction motors 314. At a deactivation time 518, one of the traction motor blowers 316 is turned off and the remaining traction motor blowers 316 are operated at a reduced speed (e.g., at half of a previous operating speed or at half of the rated maximum speed of the traction motor blowers 316).

Subsequent to the deactivation time 518, the operating temperatures 502, 504, 506, 508, 510 of the traction motors 314 that are cooled by the traction motor blower 316 that is on (but operating at reduced speeds) gradually increase over time. The operating temperatures 502, 504, 506, 508, 510 may increase because a reduced airflow is generated by the traction motor blowers 316 to cool the traction motors 314 that are still on. The operating temperatures 500 of the traction motor 314 that is deactivated may decrease following the deactivation time 518 because the traction motor 314 is no longer active.

The control system 302 can monitor the operating temperatures 500, 502, 504, 506, 508, 510 and at least partially base the decision of whether to turn off one or more traction motors 314 and/or which traction motors 314 are to be turned off on the operating temperatures 500, 502, 504, 506, 508, 510. For example, at a later decision time 520, the control system 302 may examine determine that one traction motor 314 can be turned off and can examine the operating temperatures 500, 502, 504, 506, 508, 510 to determine which traction motor 314 to turn off. The control system 302 may select one or more of the traction motors 314 corresponding to the operating temperatures 502, 504, and/or 506 for turning off because these traction motors 314 exhibit the largest operating temperatures 502, 504, 506. The control system 302 may turn off one or more of these traction motors 314 and turn on the deactivated traction motor 314. For example, if only a single traction motor 314 is to be turned off to still provide the tractive load demanded by the vehicle system 200, then the control system 302 may decide to turn off the two traction motors 314 having the operating temperatures 502, 504 and to turn on the traction motor 314 having the reduced operating temperature 500.

In one embodiment, a method (e.g., for operating a vehicle traction control system of a vehicle system during movement of the vehicle system) includes, during movement of a vehicle system along a route, determining a tractive load demanded by the vehicle system to propel the vehicle system along the route. The vehicle system includes a propulsion-generating vehicle having plural individually controllable traction motors. The method also can include identifying a first selected set of the traction motors for deactivation during the movement of the vehicle system along the route based at least in part on the tractive load demanded by the vehicle system, and deactivating the traction motors in the first selected set while at least one of the traction motors in a first remaining set of the traction motors continues to generate tractive effort to propel the vehicle system. One or more of the operations of the method (e.g., the determining of a tractive load demanded by the vehicle system, identifying the first selected set of the traction motors, and/or deactivating the traction motors) may be performed by one or more processors disposed onboard the vehicle system.

In one aspect, the tractive load demanded by the vehicle system is determined independent of a location of the vehicle system.

In one aspect, deactivating the traction motors in the first selected set occurs at a first time during movement of the vehicle system along the route. The method also can include re-determining the tractive load demanded by the vehicle system during movement of the vehicle system, re-identifying a different, second selected set of the traction motors for deactivation during movement of the vehicle system, and deactivating the traction motors in the second selected set at a later, second time while at least one of the traction motors in a different, second remaining set of the traction motors continues to generate the tractive effort to propel the vehicle system.

In one aspect, the traction motors are operably coupled with different axles of the propulsion-generating vehicle such that deactivating the traction motors in the first selected set causes the axles to which the traction motors in the first selected set are operably coupled to no longer be rotated by the traction motors.

In one aspect, one or more of determining the tractive load or identifying the first selected set is performed onboard the vehicle system.

In one aspect, the method also can include increasing the tractive effort generated by the at least one of the traction motors in the first remaining set.

In one aspect, increasing the tractive effort can include increasing an operating state of the at least one of the traction motors in the first remaining set to a rated capacity of the at least one of the traction motors.

In one aspect, identifying the first selected set of the traction motors for deactivation includes monitoring operating temperatures of the traction motors.

In one aspect, the method also includes decreasing an operating speed of one or more traction motor blowers to reduce airflow produced by the one or more traction motor blowers to cool the traction motors in the first remaining set.

In one aspect, deactivating the traction motors in the first selected set occurs at a first time during movement of the vehicle system along the route. The method also can include switching, at a later, second time, which of the traction motors are included in the first selected set for deactivation and which of the traction motors are included in the first remaining set based at least in part on operating temperatures of the traction motors.

In another embodiment, a system (e.g., a traction control system) includes one or more processors configured to be disposed onboard a vehicle system and to determine, during movement of the vehicle system along a route, a tractive load demanded by the vehicle system to propel the vehicle system. The vehicle system includes a propulsion-generating vehicle having plural individually controllable traction motors. The one or more processors also are configured to identify a first selected set of the traction motors for deactivation during movement of the vehicle system along the route based at least in part on the tractive load demanded by the vehicle system and to deactivate the traction motors in the first selected set while at least one of the traction motors in a first remaining set of the traction motors continues to generate tractive effort to propel the vehicle system.

In one aspect, the one or more processors are configured to determine the tractive load demanded by the vehicle system independent of a location of the vehicle system.

In one aspect, the one or more processors are configured to deactivate the traction motors in the first selected set at a first time during movement of the vehicle system along the route. The one or more processors can be configured to re-determine the tractive load demanded by the vehicle system during movement of the vehicle system, re-identify a different, second selected set of the traction motors for deactivation during movement of the vehicle system, and to deactivate the traction motors in the second selected set at a later, second time while at least one of the traction motors in a different, second remaining set of the traction motors continues to generate the tractive effort to propel the vehicle system.

In one aspect, the traction motors are operably coupled with different axles of the propulsion-generating vehicle. The one or more processors can be configured to deactivate the traction motors in the first selected set to cause the axles to which the traction motors in the first selected set are operably coupled to no longer be rotated by the traction motors.

In one aspect, the one or more processors are configured to one or more of determine the tractive load or identify the first selected set while the one or more processors are disposed onboard the vehicle system.

In one aspect, the one or more processors are configured to increase the tractive effort generated by the at least one of the traction motors in the first remaining set.

In one aspect, the one or more processors are configured to increase the tractive effort by increasing an operating state of the at least one of the traction motors in the first remaining set to a rated capacity of the at least one of the traction motors.

In another embodiment, another system (e.g., another traction control system) includes one or more processors configured to monitor tractive loads demanded to propel a vehicle system along a route as the vehicle system moves along the route. The one or more processors are configured to identify one or more traction motors of a vehicle in the vehicle system to turn off based at least in part in a change in the tractive loads demanded to propel the vehicle system. The one or more processors are configured to generate control signals to turn off the one or more traction motors while one or more other traction motors remain on to generate tractive forces that meet or exceed the tractive loads demanded to propel the vehicle system during movement of the vehicle system along the route.

In one aspect, the one or more processors also are configured to identify which ones of the one or more traction motors to turn off based at least in part on operating temperatures of the one or more traction motors.

In one aspect, the one or more processors also are configured to reduce an operating speed of one or more traction motor blowers that cool the one or more other traction motors that remain on responsive to turning off the one or more traction motors.

In another embodiment, another method (e.g., for controlling a traction control system) includes, during movement of a vehicle system along a route, determining a tractive load demanded by the vehicle system to propel the vehicle system along the route. The vehicle system includes a first propulsion-generating vehicle having a first plurality of individually controllable traction motors and a second propulsion-generating vehicle having a second plurality of individually controllable traction motors. The first and second vehicles are linked to travel together along the route. The method also includes identifying a first selected set of the first plurality of traction motors for deactivation during movement of the vehicle system along the route based at least in part on the tractive load demanded by the vehicle system, deactivating the traction motors in the first selected set while at least one of the traction motors in a first remaining set of the first plurality of traction motors continues to generate tractive effort to propel the vehicle system, identifying a second selected set of the second plurality of traction motors for deactivation during movement of the vehicle system along the route based at least in part on the tractive load demanded by the vehicle system, and deactivating the traction motors in the second selected set while at least one of the traction motors in a second remaining set of the second plurality of traction motors continues to generate tractive effort to propel the vehicle system.

In one aspect, the method also can include identifying a third selected set of one or more of the traction motors in the first plurality of traction motors of the first propulsion-generating vehicle and one or more of the traction motors in the second plurality of traction motors of the second propulsion-generating vehicle, and deactivating the traction motors in the third selected set while at least one of the traction motors in the first propulsion-generating vehicle and at least one of the traction motors in the second propulsion-generating vehicle continue to generate the tractive effort to propel the vehicle system.

In another embodiment, another system (e.g., another traction control system) includes one or more processors configured to be disposed onboard a vehicle system and to determine, during movement of the vehicle system along a route, determine a tractive load demanded by the vehicle system to propel the vehicle system along the route. The vehicle system includes a first propulsion-generating vehicle having a first plurality of individually controllable traction motors and a second propulsion-generating vehicle having a second plurality of individually controllable traction motors, the first and second vehicles being linked to travel together along the route. The one or more processors also are configured to identify a first selected set of the first plurality of traction motors for deactivation during movement of the vehicle system along the route based at least in part on the tractive load demanded by the vehicle system, and to deactivate the traction motors in the first selected set while at least one of the traction motors in a first remaining set of the first plurality of traction motors continues to generate tractive effort to propel the vehicle system. The one or more processors also are configured to identify a second selected set of the second plurality of traction motors for deactivation during movement of the vehicle system along the route based at least in part on the tractive load demanded by the vehicle system, and to deactivate the traction motors in the second selected set while at least one of the traction motors in a second remaining set of the second plurality of traction motors continues to generate tractive effort to propel the vehicle system.

In one aspect, the one or more processors are configured to identify a third selected set of one or more of the traction motors in the first plurality of traction motors of the first propulsion-generating vehicle and one or more of the traction motors in the second plurality of traction motors of the second propulsion-generating vehicle, and to deactivate the traction motors in the third selected set while at least one of the traction motors in the first propulsion-generating vehicle and at least one of the traction motors in the second propulsion-generating vehicle continue to generate the tractive effort to propel the vehicle system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A method comprising:
   during movement of a vehicle system along a route, determining, using one or more processors, a tractive load demanded by the vehicle system to propel the vehicle system along the route, the vehicle system including a first propulsion-generating vehicle having a first plurality of individually controllable traction motors and a second propulsion-generating vehicle having a second plurality of individually controllable traction motors, the first and second vehicles being linked to travel together along the route, each of the traction motors in the first plurality and in the second plurality coupled with a different axle of the vehicle system such that each of the traction motors individually controls the corresponding axle of the vehicle system;
   identifying, using the one or more processors, a first selected set of the first plurality of traction motors for deactivation during the movement of the vehicle system along the route based at least in part on the tractive load demanded by the vehicle system;
   deactivating, using the one or more processors, the traction motors in the first selected set while at least one of the traction motors in a first remaining set of the first plurality of traction motors continues to generate tractive effort to propel the vehicle system;
   identifying, using the one or more processors, a second selected set of the second plurality of traction motors for deactivation during movement of the vehicle system along the route based at least in part on the tractive load demanded by the vehicle system; and
   deactivating, using the one or more processors, the traction motors in the second selected set while at least one of the traction motors in a second remaining set of the second plurality of traction motors continues to generate tractive effort to propel the vehicle system.

2. The method of claim 1, further comprising:
   identifying, using the one or more processors, a third selected set of one or more of the traction motors in the first plurality of traction motors of the first propulsion-generating vehicle and one or more of the traction motors in the second plurality of traction motors of the second propulsion-generating vehicle; and
   deactivating, using the one or more processors, the traction motors in the third selected set while at least one of the traction motors in the first propulsion-generating vehicle and at least one of the traction motors in the second propulsion-generating vehicle continue to generate the tractive effort to propel the vehicle system.

3. A system comprising:
   one or more processors configured to be disposed onboard a vehicle system and to determine, during movement of the vehicle system along a route, a tractive load demanded by the vehicle system to propel the vehicle system along the route, the vehicle system including a first propulsion-generating vehicle having a first plurality of individually controllable traction motors and a second propulsion-generating vehicle having a second plurality of individually controllable traction motors, the first and second vehicles being linked to travel together along the route, each of the traction motors in the first plurality and in the second plurality coupled with a different axle of the vehicle system such that each of the traction motors individually controls the corresponding axle of the vehicle system,
   wherein the one or more processors also are configured to identify a first selected set of the first plurality of traction motors for deactivation during the movement of the vehicle system along the route based at least in part on the tractive load demanded by the vehicle system, and to deactivate the traction motors in the first selected set while at least one of the traction motors in a first remaining set of the first plurality of traction motors continues to generate tractive effort to propel the vehicle system, and
   wherein the one or more processors also are configured to identify a second selected set of the second plurality of traction motors for deactivation during movement of the vehicle system along the route based at least in part on the tractive load demanded by the vehicle system, and to deactivate the traction motors in the second selected set while at least one of the traction motors in a second remaining set of the second plurality of traction motors continues to generate tractive effort to propel the vehicle system.

4. The system of claim 3, wherein the one or more processors are configured to identify a third selected set of one or more of the traction motors in the first plurality of traction motors of the first propulsion-generating vehicle and one or more of the traction motors in the second plurality of traction motors of the second propulsion-generating vehicle, and to deactivate the traction motors in the third selected set while at least one of the traction motors in the first propulsion-generating vehicle and at least one of the traction motors in the second propulsion-generating vehicle continue to generate the tractive effort to propel the vehicle system.

5. The system of claim 3, wherein one or more of the first or second propulsion-generating vehicles is a locomotive.

6. The system of claim 3, wherein one or more of the first or second propulsion-generating vehicles is a mining vehicle.

7. The system of claim 3, wherein the one or more processors are configured to increase the tractive effort generated by the at least one of the traction motors in the first remaining set to a rated capacity of the at least one of the traction motors.

8. The system of claim 3, wherein one or more of the first or second propulsion-generating vehicles is an automobile.

9. The system of claim 3, wherein the one or more processors are configured to determine the tractive load demanded by the vehicle system independent of a location of the vehicle system.

10. The system of claim 3, wherein the one or more processors are configured to deactivate the traction motors in the first selected set at a first time during the movement of the vehicle system along the route, and wherein the one or more processors are configured to re-determine the tractive load demanded by the vehicle system during the movement of the vehicle system, re-identify a different, second selected set of the traction motors for deactivation during movement of the vehicle system, and deactivate the traction motors in the second selected set at a later, second time while at least one of the traction motors in a different, second remaining set of the traction motors continues to generate the tractive effort to propel the vehicle system.

11. The system of claim 3, wherein the one or more processors are configured to one or more of determine the tractive load or identify the first selected set while the one or more processors are disposed onboard the vehicle system.

12. The method of claim 1, wherein the traction motors in the first selected set are identified for deactivation based on operating temperatures of the traction motors in the first selected set.

13. The method of claim 1, further comprising decreasing, using the one or more processors, an operating speed of one or more traction motor blowers to reduce airflow produced by the one or more traction motor blowers to cool the traction motors in the first remaining set.

14. The method of claim 1, wherein the traction motors in the first selected set are deactivated at a first time during the movement of the vehicle system along the route, and further comprising:
  re-determining the tractive load demanded by the vehicle system during the movement of the vehicle system;
  re-identifying a different, second selected set of the traction motors for deactivation during movement of the vehicle system; and
  deactivating the traction motors in the second selected set at a later, second time while at least one of the traction motors in a different, second remaining set of the traction motors continues to generate the tractive effort to propel the vehicle system.

15. The method of claim 1, wherein one or more of the tractive load is determined or the first selected set is identified while the one or more processors are disposed onboard the vehicle system.

16. The method of claim 1, further comprising increasing the tractive effort generated by the at least one of the traction motors in the first remaining set to a rated capacity of the at least one of the traction motors.

17. The method of claim 1, wherein the traction motors are coupled with the different axles such that deactivating the traction motors in the first selected set causes the axles to which the traction motors in the first selected set are coupled to no longer be rotated by the traction motors in the first selected set.

18. The method of claim 1, wherein the tractive load demanded by the vehicle system is determined independent of a location of the vehicle system.

19. A system comprising:
  one or more processors configured to be disposed onboard a vehicle system and to determine a tractive load demanded by the vehicle system during movement of the vehicle system along a route, the vehicle system including at least first and second propulsion-generating vehicles each having a plurality of individually controllable traction motors, the first and second propulsion-generating vehicles linked to travel together, each of the traction motors coupled with a different axle of the vehicle system such that each of the traction motors individually controls the corresponding axle of the vehicle system,
  wherein the one or more processors also are configured to identify a first set of the traction motors of the first propulsion-generating vehicle for deactivation during the movement of the vehicle system along the route based at least in part on the tractive load demanded by the vehicle system, and to deactivate the traction motors in the first selected set while at least one of the traction motors in a first remaining set of the first plurality of traction motors continues to generate tractive effort to propel the vehicle system, and
  wherein the one or more processors also are configured to identify a second selected set of the second plurality of traction motors for deactivation during movement of the vehicle system along the route based at least in part on the tractive load demanded by the vehicle system, and to deactivate the traction motors in the second selected set while at least one of the traction motors in a second remaining set of the second plurality of traction motors continues to generate tractive effort to propel the vehicle system.

20. The system of claim 19, wherein the one or more processors are configured to identify a third selected set of one or more of the traction motors in the first plurality of traction motors of the first propulsion-generating vehicle and one or more of the traction motors in the second plurality of traction motors of the second propulsion-generating vehicle, and to deactivate the traction motors in the third selected set while at least one of the traction motors in the first propulsion-generating vehicle and at least one of the traction motors in the second propulsion-generating vehicle continue to generate the tractive effort to propel the vehicle system.

21. The system of claim 19, wherein one or more of the first or second propulsion-generating vehicles is a locomotive, a mining vehicle, or an automobile.

22. The system of claim 19, wherein the one or more processors are configured to determine the tractive load demanded by the vehicle system independent of a location of the vehicle system.

* * * * *